United States Patent
Huang et al.

(10) Patent No.: US 9,798,449 B2
(45) Date of Patent: Oct. 24, 2017

(54) FUZZY SEARCH AND HIGHLIGHTING OF EXISTING DATA VISUALIZATION

(71) Applicants: Qiurong Huang, Shanghai (CN); Jinming Zhang, Shanghai (CN)

(72) Inventors: Qiurong Huang, Shanghai (CN); Jinming Zhang, Shanghai (CN)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 355 days.

(21) Appl. No.: 14/552,062

(22) Filed: Nov. 24, 2014

(65) Prior Publication Data

US 2016/0147879 A1    May 26, 2016

(51) Int. Cl.
  *G06F 17/30* (2006.01)
  *G06F 3/0484* (2013.01)
  *G06K 9/20* (2006.01)

(52) U.S. Cl.
  CPC ...... *G06F 3/0484* (2013.01); *G06F 17/30395* (2013.01); *G06F 17/30542* (2013.01); *G06F 17/30554* (2013.01); *G06K 9/2054* (2013.01)

(58) Field of Classification Search
  None
  See application file for complete search history.

(56) References Cited

U.S. PATENT DOCUMENTS

| | | | |
|---|---|---|---|
| 7,761,324 B2* | 7/2010 | Amerasinghe | G06Q 10/063 705/7.11 |
| 8,255,454 B2* | 8/2012 | Broda | G06F 9/4443 709/203 |
| 8,306,845 B2* | 11/2012 | D'Imporzano | G06Q 10/06393 705/7.29 |
| 8,839,089 B2* | 9/2014 | Dorrell | G06F 17/30 715/212 |
| 8,990,258 B2* | 3/2015 | Bhatia | G06F 17/30893 707/768 |
| 2004/0032420 A1* | 2/2004 | Allen | G06Q 40/00 715/700 |
| 2007/0208608 A1* | 9/2007 | Amerasinghe | G06Q 10/063 705/7.11 |
| 2009/0307054 A1* | 12/2009 | D'Imporzano | G06Q 10/06393 705/7.29 |

(Continued)

*Primary Examiner* — Wilson Lee
(74) *Attorney, Agent, or Firm* — Fountainhead Law Group P.C.

(57) ABSTRACT

A user may provide input to search an existing visualization (e.g., bar chart, graph) of a dataset returned in response to database querying. A highlighted visualization may then provide additional insight into relationships within the dataset. The highlighting may comprise changes to the appearance (e.g., size, color, background) of visualization elements. The search and highlighting may be executed by a functional module in an application layer of a local client in communication with database on a remote server. A search engine of the functional module may perform searching of dimension names, dimension values, and measure names within the dataset, identifying particular elements of the data set that are relevant to a search term (e.g., "q1"). Based upon recognition of relevant dataset data, a visualization engine may highlight particular elements of the visualization (e.g., changing an appearance of vertical bars showing first quarter revenue relative to vertical bars for other quarters).

14 Claims, 8 Drawing Sheets

(56) References Cited

U.S. PATENT DOCUMENTS

| | | | |
|---|---|---|---|
| 2010/0005411 A1* | 1/2010 | Duncker | G06F 17/30873 715/769 |
| 2012/0079431 A1* | 3/2012 | Toso | G06F 17/30554 715/836 |
| 2013/0111321 A1* | 5/2013 | Dorrell | G06F 17/30 715/215 |
| 2013/0187926 A1* | 7/2013 | Silverstein | G06Q 10/105 345/440 |
| 2013/0212060 A1* | 8/2013 | Crouse | G06F 17/30563 707/602 |
| 2015/0026153 A1* | 1/2015 | Gupta | G06F 17/30336 707/711 |
| 2015/0212663 A1* | 7/2015 | Papale | G06F 17/30424 715/762 |
| 2015/0317572 A1* | 11/2015 | Balasubramanian | G06Q 10/06 705/7.11 |
| 2016/0124960 A1* | 5/2016 | Moser | G06F 17/30554 707/723 |

\* cited by examiner

FUZZY SEARCH AND HIGHLIGHTING OF EXISTING DATA VISUALIZATION

BACKGROUND

The present invention relates to user interfaces, and in particular, to searching and highlighting of an existing visualization of available data.

Unless otherwise indicated herein, the approaches described in this section are not prior art to the claims in this application and are not admitted to be prior art by inclusion in this section.

Databases offer a powerful way of storing large amounts of related data, which may be organized according to data structures. Users may access and explore the data stored in the database by posing queries that specify relevant search parameters.

In response to such queries, a search result will be returned from the database to a user. In particular, an interface will often present the search result in the form of a specific visualization (e.g., chart, graph) that provides focused insight into relationships between the data of the query result.

However, databases are increasing in both size and complexity. Thus, a visualization of database data may still offer a user a large volume of data to assimilate. The sheer mass of data present in a single visualization may dilute or even undermine its ability to convey desirable insight to the user.

A user may decide promulgate a new query based upon the original search result in order to further refine the data returned from the database. However, such additional querying may undesirably exclude information from the original search result. By omitting the excluded information, a corresponding visualization of the results of a new query may not allow a user to recognize valuable relationships extant in data of the original search result.

SUMMARY

Embodiments provide methods and apparatuses allowing a user to provide input to search an existing visualization (e.g., bar chart, graph) of a dataset returned in response to database querying. Based upon the user input, a highlighted version of the visualization may be displayed to provide additional insight into relationships within the dataset. The highlighting may comprise changes to the appearance (e.g., size, color, font, background, etc.) of elements within the visualization.

The search and highlighting may be executed by a functional module present in a separate application layer overlying the database. In some embodiments, this application layer may reside in a local client that is remote from a server hosting the database layer.

A search engine of the functional module may perform fuzzy searching of dimension names, dimension values, and measure names within the dataset. With reference to an index, the search engine may identify particular elements of the data set that are relevant to the search term. An example is where the user types in "q1", and the search engine recognizes first quarter revenue data as being relevant to the fuzzy search.

Based upon this recognition of dataset data relevant to the search term, a visualization engine may highlight particular elements of the visualization. For example, the visualization engine may change an appearance of vertical bars showing first quarter revenue, relative to the appearance of bars showing revenue during other quarters.

In certain embodiments, the functional module may perform search and highlighting without further accessing the database layer. Instead, the functional module may reference the dataset originally returned to the application layer in response to the query.

Some embodiments may provide for a further extension of functionality. For example, a user may instruct filtering of input in the highlighted visualization.

An embodiment of a computer-implemented method comprises providing an application layer including a dataset responsive to a database query, and an existing visualization of the dataset including a visualization element. A functional module of the application layer receives a search input from a user. The functional module searches the dataset according to the search input to produce a search result. The functional module generates a highlighted visualization from the search result and the existing visualization, the highlighted visualization including a changed appearance of the visualization element. The application layer communicates the highlighted visualization to the user.

A non-transitory computer readable storage medium embodies a computer program for performing a method comprising providing an application layer including a dataset comprising a dimension name, a dimension value, and a measure name responsive to a database query. The application layer is further provided with an existing visualization of the dataset including a visualization element. A functional module of the application layer receives a search input from a user, the search input comprising a dimension name, a dimension value, or a measure name. The functional module searches the dataset according to the search input to produce a search result. The functional module generates a highlighted visualization from the search result and the existing visualization, the highlighted visualization including a changed appearance of the visualization element. The application layer communicates the highlighted visualization to the user.

An embodiment of a computer system comprises one or more processors and a software program executable on said computer system. The software program is configured to provide an application layer including a dataset comprising a dimension name, a dimension value, and a measure name responsive to a database query. The application is further provided including an existing visualization of the dataset including a visualization element. A functional module of the application layer is caused to receive a search input from a user, the search input comprising a dimension name, a dimension value, or a measure name. A search engine of the functional module is caused to search the dataset according to the search input to produce a search result. A visualization engine of the functional module is caused to generate a highlighted visualization from the search result and the existing visualization, the highlighted visualization including a changed appearance of the visualization element. The application layer is caused to communicate the highlighted visualization to the user.

In certain embodiments the dataset comprises a dimension and the search input reflects a dimension name or a dimension value.

According to some embodiments the dataset comprises a measure and the search input reflects a measure name.

In particular embodiments a search engine of the function module performs the searching according to a fuzzy search index.

In various embodiments the existing visualization comprises a chart and the visualization element changed in appearance comprises a data point, a legend text, and/or a category axis label.

Embodiments may further comprise the functional module receiving an extended input from the user in response to the highlighted visualization, the functional module processing the dataset according to the extended search input to produce an extended search result, the functional module generating an extended visualization from the extended search result and the highlighted visualization, and the application layer communicating the extended visualization to the user.

According to some embodiments the extended input comprises a filter, the extended search result is smaller than the search result, and the extended visualization includes fewer elements than the highlighted visualization.

In various embodiments the highlighted visualization comprises a horizontal bar chart, a vertical bar chart, a plot, or a pie chart.

The following detailed description and accompanying drawings provide a better understanding of the nature and advantages of the present invention.

DETAILED DESCRIPTION

Described herein are techniques for searching and/or highlighting an existing visualization of database data. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
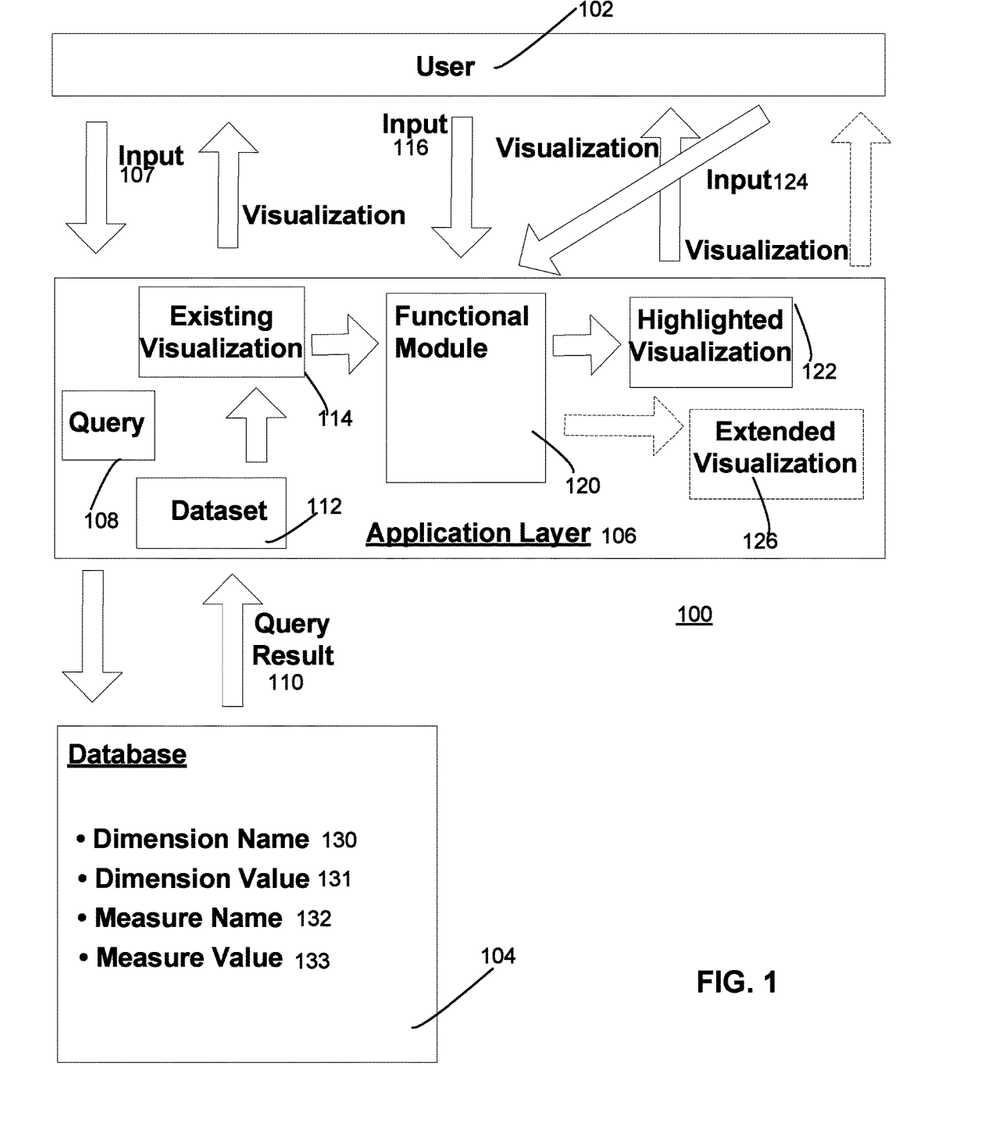
FIG. 1 illustrates a simplified view of a system configured to implement visualization searching and highlighting according to an embodiment.

FIG. 1 illustrates a simplified view of a system 100 configured to implement visualization searching and highlighting according to an embodiment. Specifically, a user 102 is in communication with data stored in a database 104, via an intervening application layer 106. In certain embodiments, the application layer may be present on a client side that is in communication with the remote database on a server side.

The database is configured to store data organized according to larger data structures, which are sometimes called data objects. One component of a data structure is a dimension name 130, which identifies a particular type of related data (e.g., sales quarter). Another component of a data structure is a dimension value 131, which identifies the value of the dimension (e.g., q3 for the third sales quarter).

Another component of a data structure is a measure name 132. A measure name identifies a measured quantity that is stored in the database (e.g., sales revenue). Still another component of a data structure is a measure value 133, which identifies the actual value of the measure (e.g., a $ amount).

The user is configured to provide input 107 to the application layer in order to formulate a query 108 for interrogating data in the database. The application layer then transmits this query to the application layer for processing.

In response, the database layer returns of the application layer, a query result 110. This query result includes a dataset 112 of information relevant to the query. The dataset may comprise dimension names, dimension values, measure names, and measure values.

The application layer receives the dataset, and generates therefrom an existing visualization 114 of data in the data set. One example of such a visualization is a vertical bar chart, although a variety of other types of visualizations are known, including but not limited to pie charts, graphs, and others.

The application layer then provides this existing visualization to the user for his or her review. Upon reviewing the existing visualization, the user may seek to gain further insight by searching and highlighting the visualization. Accordingly, the user may provide further input 116 to the application layer. This further input may take the form of a search term for fuzzy logic processing.

A functional module 120 of the application layer, may receive both the additional user input and the existing visualization. From this input, the functional module searches the dataset and produces a highlighted visualization 122 indicating relation between the search term and the data within the dataset. The nature of this highlighting is discussed in detail below, and the structure and operation of the function module is described in detail in connection with FIG. 3.

The functional module then presents the highlighted visualization for the user's inspection.

Optionally, the user may provide extended input 124 to the application layer. This extended input may identify certain of the data of the highlighted visualization, that is to be filtered to provide a clearer view of relevant data.

The functional module receives this extended input and the highlighted visualization, and processes it. The application layer then provides a filtered visualization 126 back to the user.

Figure 2:
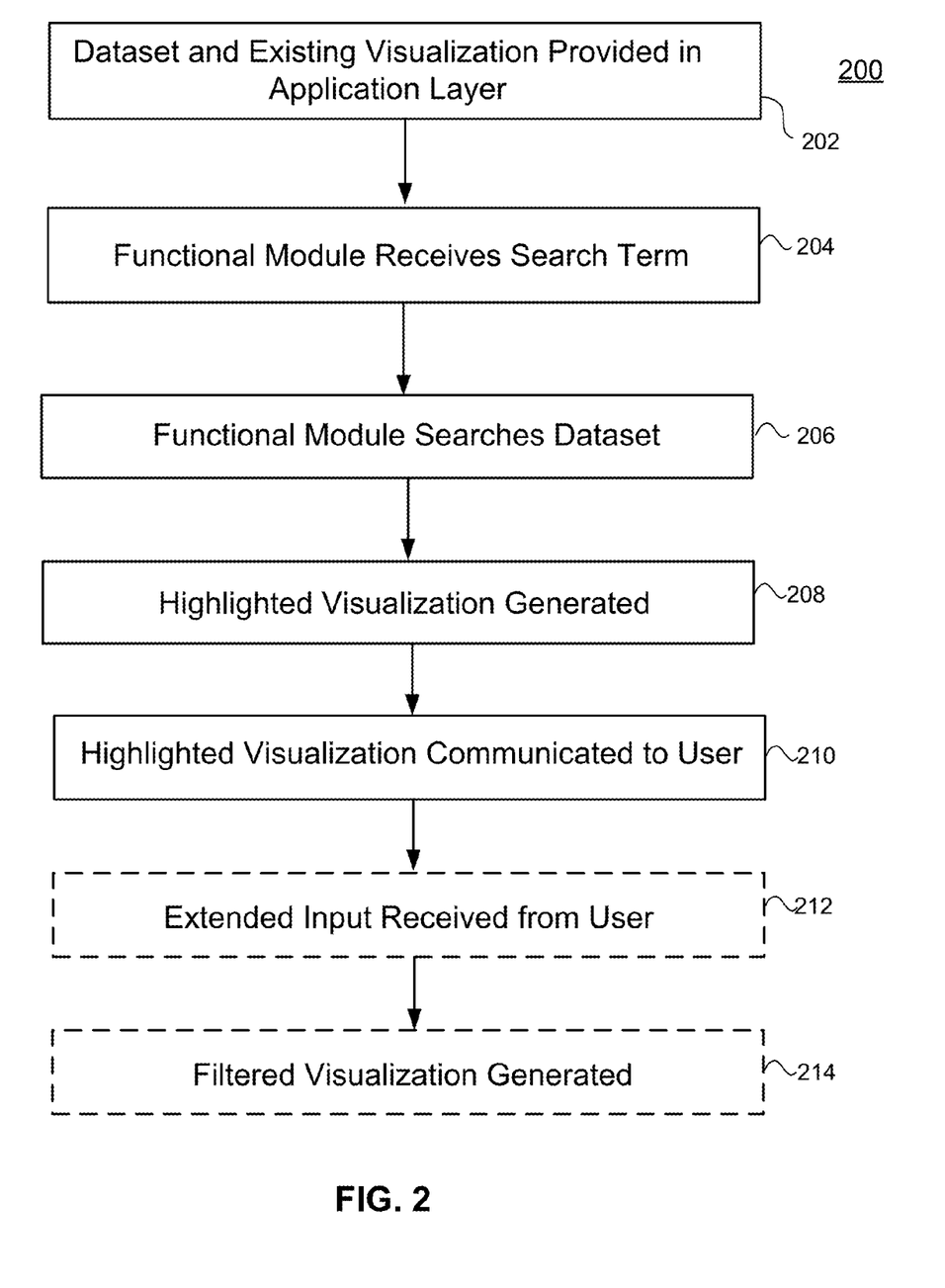
FIG. 2 illustrates a simplified flow of a process for searching and highlighting an existing visualization according to an embodiment.

FIG. 2 illustrates a simplified flow of a process 200 for searching and highlighting an existing visualization according to an embodiment. In a first step 202, a dataset comprising dimensions and measures responsive to a database query, and an existing visualization of that dataset, are provided in an application layer.

In a second step 204, a functional module receives a search term from the user. In a third step 206, the functional module searches the dataset based upon the user input to identify data relevant to the search term.

In a fourth step, 208 the functional module generates a highlighted visualization from the existing visualization and data relevant to the search. In a fifth step 210, the application layer provides the highlighted visualization to the user.

In an optional sixth step 212, the user may provide an extended input (such as a filter) to the application layer. In an optional seventh step 214, the application layer may process the highlighted visualization and the extended input to produce an extended (e.g., filtered) visualization.

That extended visualization may then be provided by the application layer back to the user for his or her review.

Figure 3:
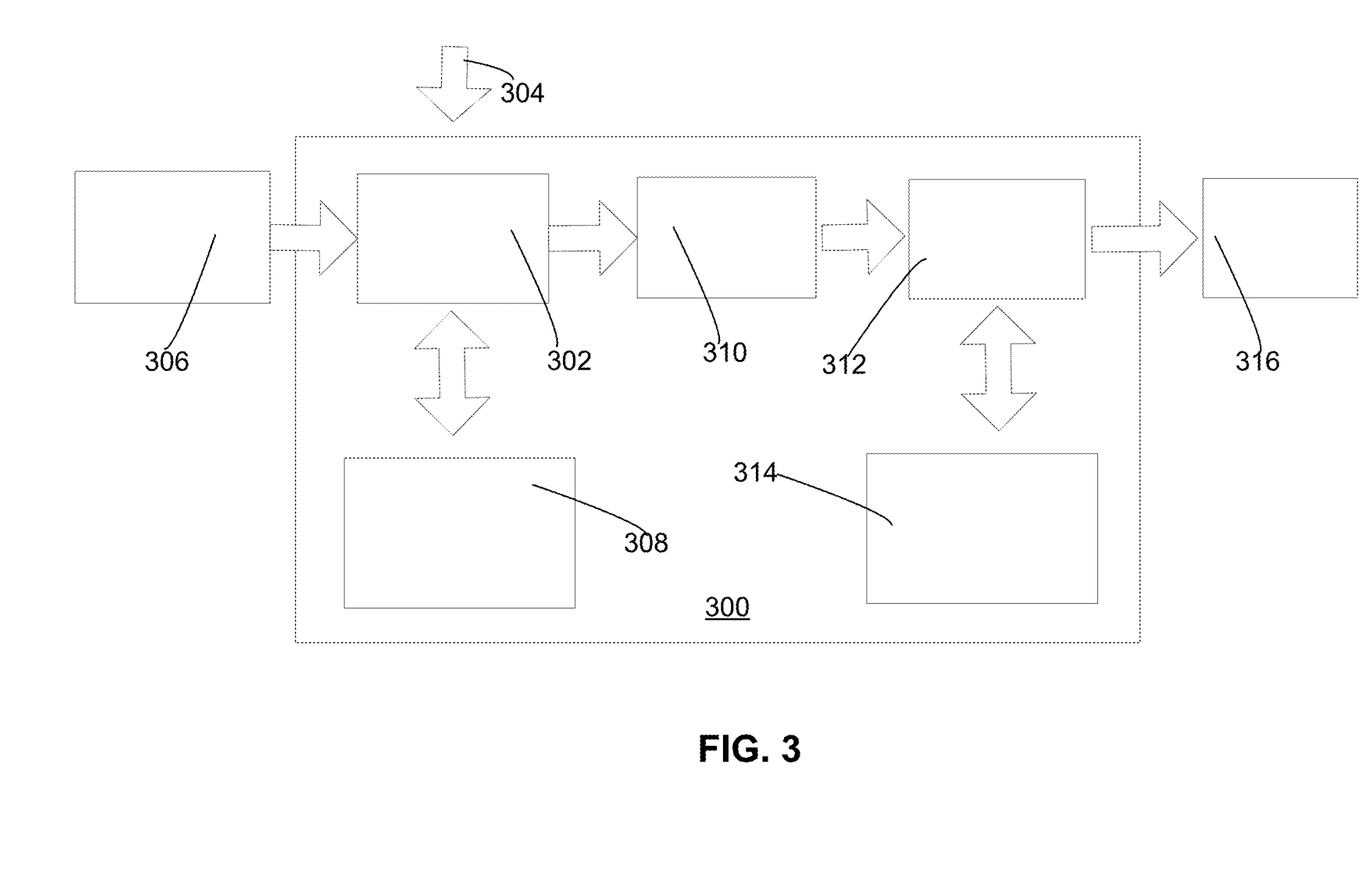
FIG. 3 illustrates a simplified view of a functional module.

As mentioned above, embodiments may allow a user to perform a search within available data of an existing visualization. This searching may be performed by a function module 300 as illustrated in FIG. 3.

In particular, the function module may include a fuzzy search engine 302 that is configured to receive as inputs, a search term 304 and a dataset 306 of an original visualization. The fuzzy search engine is then configured to reference an index 308 in order to implement fuzzy searching of the dataset based on the search term.

The search scope of this function module is based on the dataset for the existing visualization. Typically, this dataset can be divided into two types: 1) dimensions; and 2) measures.

As mentioned above, dimensions represent components of the larger data objects into which data of the database is organized. Measures represent various types of measured data that is stored in the data objects according to the dimensions.

Additionally, a dataset may comprise a third type: 3) Measure Name as Dimension (MND). This type uses the measure names as the dimension to categorize with the measure, rather than the dimension. However, the MND basically comprises a special case of a dimension that comprises names from measures.

Both the dimension and the measure have names and values. Therefore, three types of search areas may be defined for the purpose of searching an existing visualization:
1. dimension names;
2. dimension values (including MND); and
3. measure names.

In order to assist a user in locating data of interest in the existing visualization in a convenient and fast manner, embodiments may support fuzzy searching of these three search areas.

A fuzzy search is a process that searches for a target, which is likely to be relevant to the search keyword. Fuzzy search is performed utilizing fuzzy matching program, which returns a list of results based on likely relevance, even though search keywords and spellings may not exactly match. Accordingly, the search engine of the functional module is responsible for implementing the fuzzy search of the dataset of the existing visualization.

Upon execution of the user input upon the dataset by the engine, search results 310 are produced. In certain embodiments, these search results are not separately displayed or sorted by relevance. Rather, matches to the fuzzy may be considered equally as the results.

These fuzzy search results are then automatically highlighted in a visual way in the existing visualization by a highlighting engine 312, based upon the original visualization 314 as an input. Highlighting based upon the search results of an existing data visualization, is now discussed.

In particular, there may be multiple different zones present in a visualization. Some zones of the visualization include concentrations of data of particular interest to the user. Highlighting in those visualization zones may aid a user to notice the important information and recognize relationships between the data.

Examples of zones of an existing visualization which may be highlighted based upon searching, can include but are not limited to:
data points;
legend text; and
category axis labels.

FIG. 3 shows the output of the highlighting engine based on the search results and the existing visualization, to produce a highlighted visualization 316.

As mentioned above in connection with FIGS. 1-2, certain embodiments may support optional extensible actions being taken after highlighting of the visualization. One such action is filtering.

There are at least two filtering types:
include filter; and
exclude filter.

With the information for the highlighting data point, legend text, and/or category axis label, a user can perform either including or excluding to filter in/out the information. It can be implemented by the search/highlighting function. An example of the exclude filter would be to remove the filtered data entirely from the extended visualization.

Example

An example is now illustrated in connection with the search and highlighting of one specific existing visualization of database data. In particular, a database contains sales information regarding a number of different products.

A database user poses a query to the database for "Sales revenue of different products in quarters". The database returns a dataset as part of a search result. In this search result, "Sales Revenue" is a measure name, and "Sales Quarter" and "Product Name" are dimension names.

Figure 4A:
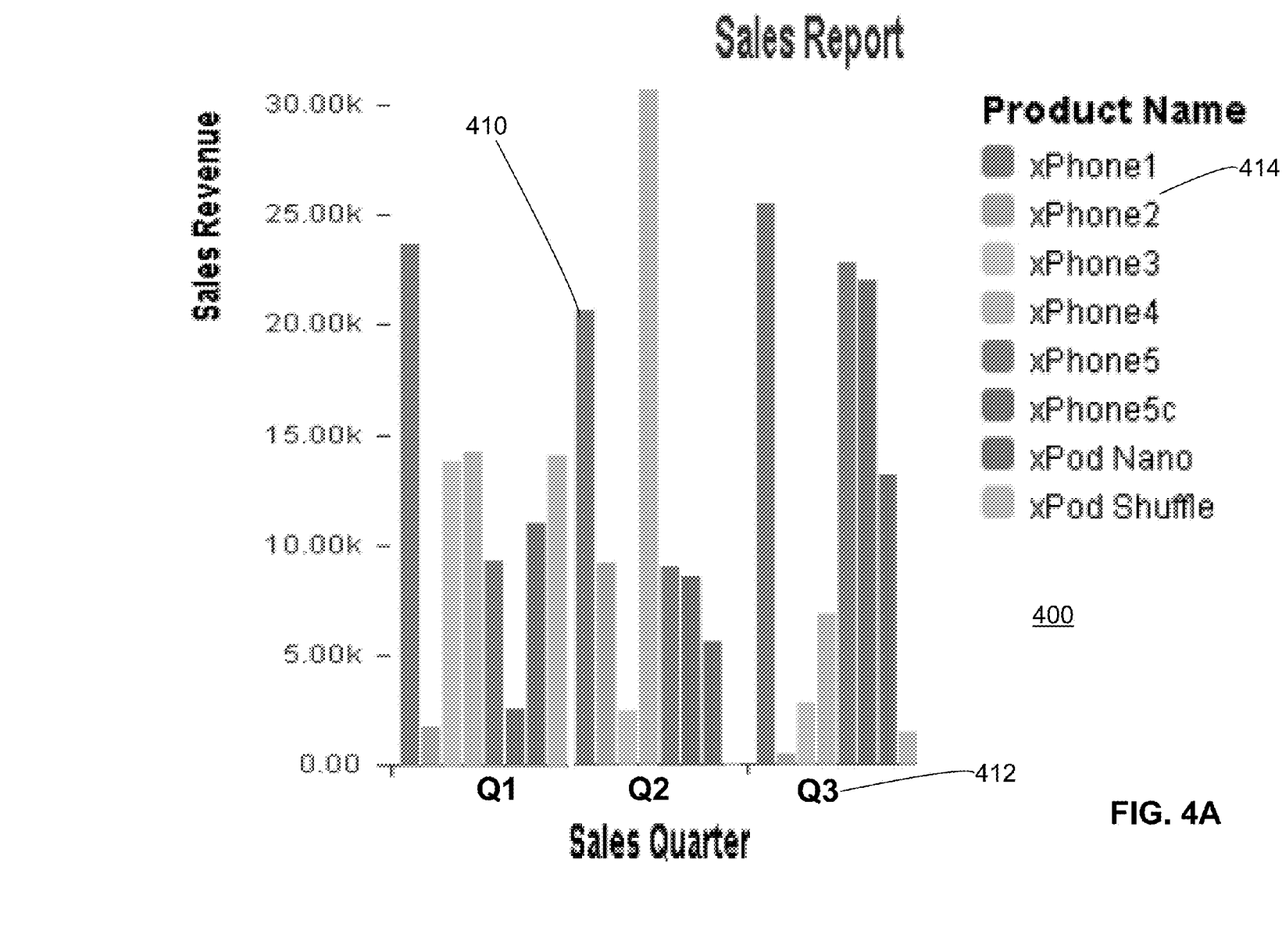
FIG. 4A shows one example of an existing visualization.

A vertical bar chart 400 as shown in FIG. 4A, is generated as a visualization of this dataset. In this vertical bar chart, "Sales Quarter" is shown as respective quarters (Q1-Q3) along the x-axis, and "Sales Revenue" is depicted along the y-axis. The "Product Name" is indicated by the color of a particular vertical bar.

As indicated above, one or more elements of this vertical bar chart may be subject to search and highlighting according to embodiments. Such visualization elements include data points represented by columns 410, a category axis label 412, and a legend text 414.

In this example, the user has been presented with an existing data visualization of all products. However, she has particular interest in the sales revenue of "xphone" products.

Figure 4B:
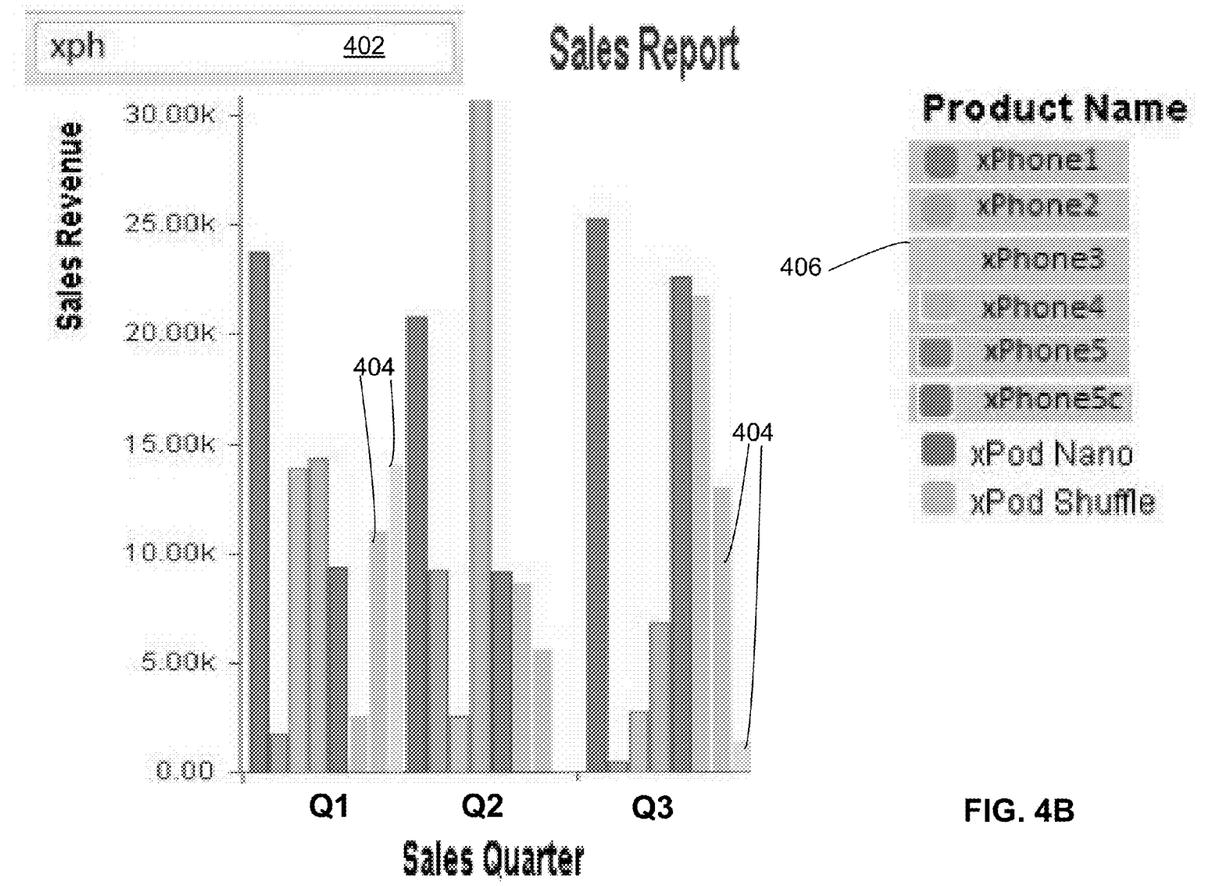
FIGS. 4B-C show examples of different highlighting of the existing visualization of FIG. 4A.

Thus as shown in FIG. 4B, the user is able to input "xph" (e.g., by typing) into the interface. As a result of this input, a search box 402 will automatically pop up to reflect the typed input. Then, upon the user pressing enter, the function module will search and highlight the corresponding elements in the vertical bar chart visualization.

As shown in FIG. 4B, the searched and highlighted elements include data points (vertical bars) whose product name contains xphone12345. Specifically, the vertical bars of these searched products retain their standard appearance. However, the vertical bars 404 corresponding to products ("Xpod Nano", "Xpod Shuffle") of the original visualization that do not meet the search, now exhibit a lightened appearance to aid a user in differentiating them from the searched products.

FIG. 4B also shows that multiple elements of a visualization may be subject to highlighting according to embodiments. Thus the visualization in FIG. 4B also includes a changed background 406 of the text of the xPhone123345c legends, while the Xpod text legends retain their original appearance.

Figure 4C:
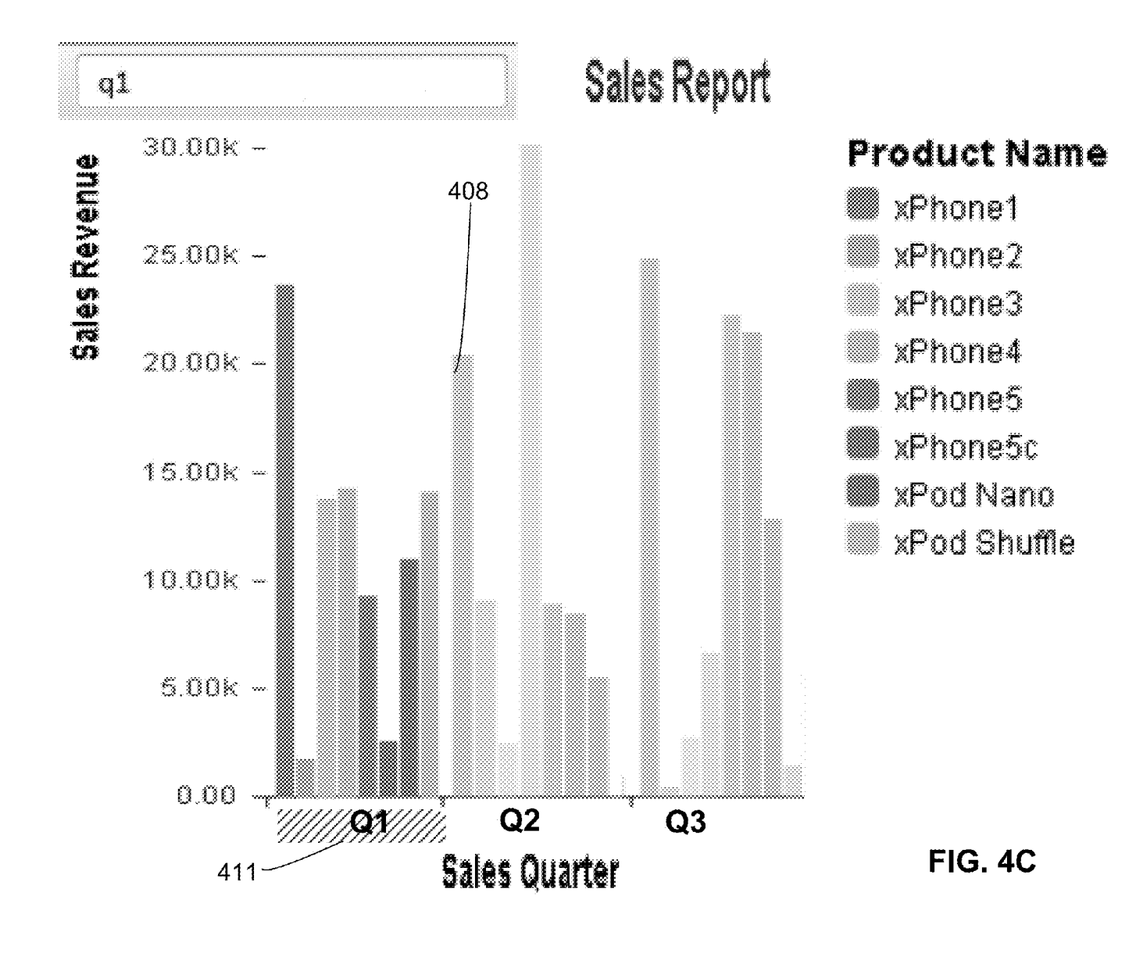

FIG. 4C shows the highlighting of the same original visualization of FIG. 4A, according to different inputs by a user. Here, the user seeks to focus upon sales revenue for all products in a particular quarter (Q1).

Thus, FIG. 4C shows the user typing in "q1", and a search box will automatically pop up. After the user presses enter, the function module highlights the corresponding elements.

One highlighted element comprises data points of the visualization. For sales revenue in Q1, these columns retain their original appearance. By contrast, product sales in different quarters (Q2, Q3) are rendered with a different (shaded) appearance 408.

Another highlighted element comprises a category axis label in FIG. 4C. That is, the Q1 axis label is afforded a gray background 411.

While the above example has focused upon an existing visualization in the form of a vertical bar chart, embodiments are not limited to this particular form of data visualization. In particular, the search scope is based upon an underlying dataset which is not constrained by a particular visualization type. Zones that are highlighted as a result of execution of the search may thus be common across a variety of different visualization types.

Accordingly, alternative embodiments may permit searching and visualization of forms of data visualization other than vertical bar charts. Examples of such visualizations include but are not limited to horizontal bar charts, pie charts, two- and three-dimensional plots, animations, and others.

Figure 5:
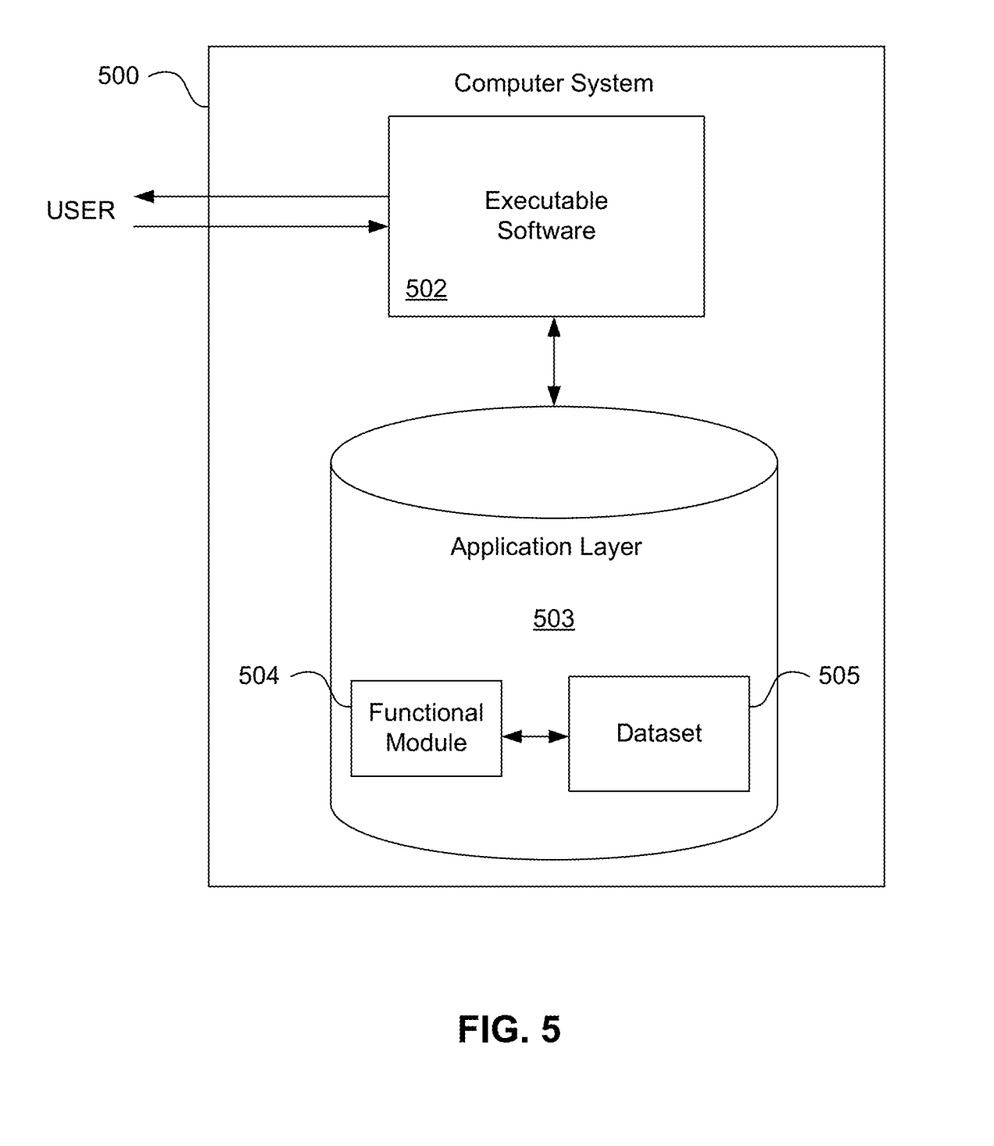
FIG. 5 illustrates hardware of a special purpose computing machine configured to implement searching and highlighting of an existing visualization.

FIG. 5 illustrates hardware of a special purpose computing machine configured to perform visualization search and highlighting according to an embodiment. In particular, computer system 500 comprises a processor 502 that is in electronic communication with a non-transitory computer-readable storage medium 503 comprising an application layer. This computer-readable storage medium has stored thereon code 505 corresponding to a dataset returned from a database query. Code 504 corresponds to a functional module. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
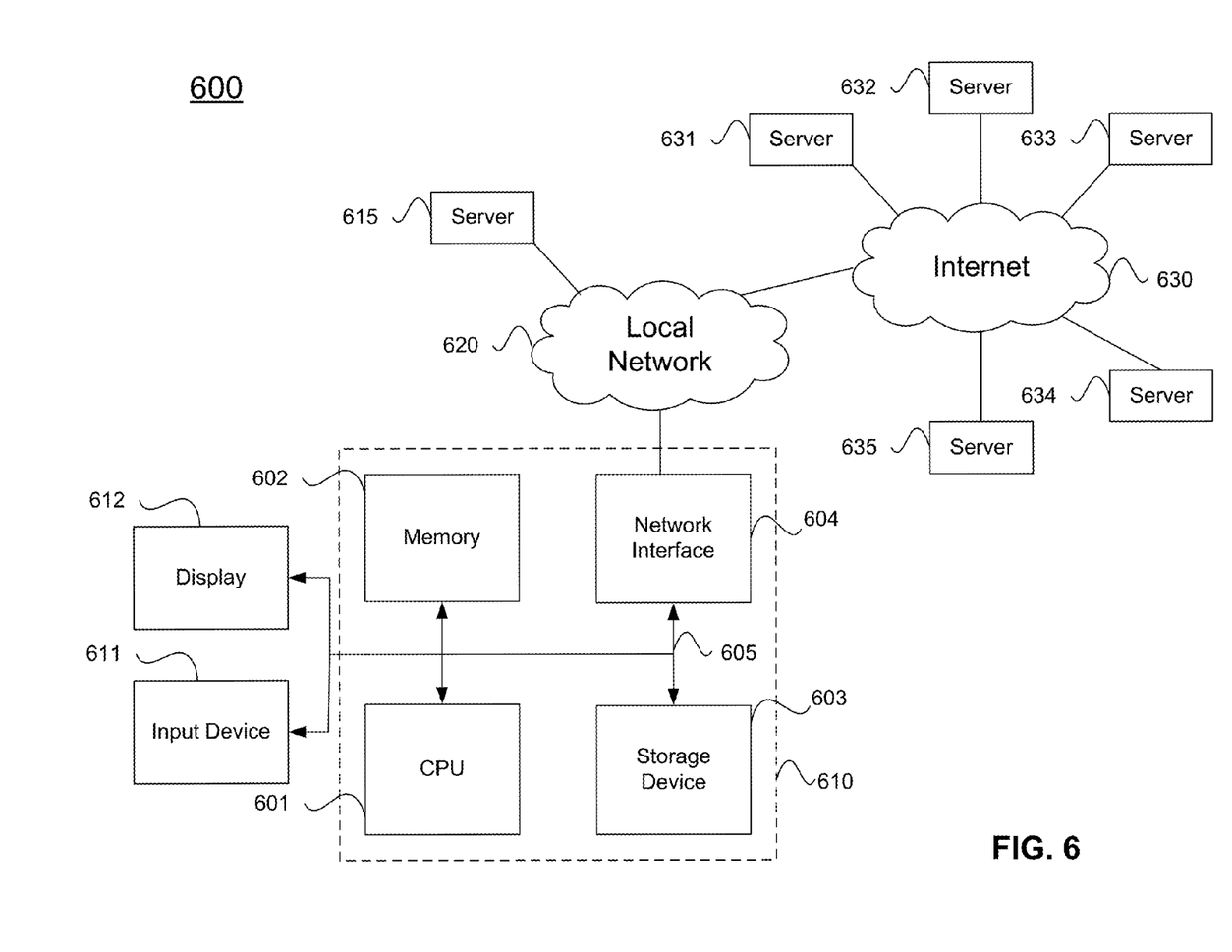
FIG. 6 illustrates an example of a computer system.

An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer system comprising:
   one or more processors;
   a software program, executable on said computer system, the software program configured to:
   provide in a Random Access Memory (RAM) of a client located remote from a server, an application layer storing,
   a dataset comprising a dimension name, a dimension value, and a measure name responsive to a database query issued by the client to the server, and
   an existing visualization of the dataset including a first visualization element;
   cause the application layer to further store executable code of a functional module of the application layer receiving a search input from a user, the search input comprising a dimension name, a dimension value, or a measure name, the functional module automatically creating a box displaying the search input;

cause a search engine of the functional module to search the dataset according to the search input and a fuzzy search index to produce a search result;

cause a visualization engine of the functional module to transform the search result and the existing visualization to create a highlighted visualization including a first changed appearance of the first visualization element and a second changed appearance of a second visualization element of the existing visualization, the second changed appearance different from the first changed appearance; and cause the application layer to communicate the highlighted visualization to the user;

wherein the software program is further configured to:

cause the functional module to receive an extended input reflecting a filter from the user in response to the highlighted visualization;

cause the functional module to process the dataset according to the extended input to produce an extended search result smaller than the search result;

cause the functional module to generate an extended visualization from the extended search result and the highlighted visualization, the extended visualization including fewer elements than the highlighted visualization;

cause the functional module to store the extended visualization in the RAM; and cause the application layer to communicate the extended visualization to the user.

2. A computer system as in claim 1 wherein the existing visualization comprises a chart and the visualization element changed in appearance comprises a data point, a legend text, and/or a category axis label.

3. A computer system as in claim 1 wherein the highlighted visualization comprises a horizontal bar chart, a vertical bar chart, a plot, or a pie chart.

4. A non-transitory computer readable storage medium embodying a computer program for performing a method, said method comprising:

providing in a Random Access Memory (RAM) of a client located remote from a server, an application layer storing, a dataset comprising a dimension name, a dimension value, and a measure name responsive to a database query issued by the client to the server, and an existing visualization of the dataset including a first visualization element;

the application layer further storing in the RAM executable code of a functional module of the application layer receiving a search input from a user, the search input comprising a dimension name, a dimension value, or a measure name, the functional module automatically creating a box displaying the search input;

the functional module searching the dataset according to the search input and a fuzzy search index to produce a search result;

the functional module transforming the search result and the existing visualization to create a highlighted visualization including a first changed appearance of the first visualization element and a second changed appearance of a second visualization element of the existing visualization, the second changed appearance different from the first changed appearance;

the application layer communicating the highlighted visualization to the user;

the functional module receiving an extended input reflecting a filter from the user in response to the highlighted visualization;

the functional module processing the dataset according to the extended input to produce an extended search result smaller than the search result;

the functional module generating an extended visualization from the extended search result and the highlighted visualization, the extended visualization including fewer elements than the highlighted visualization;

the functional module storing the extended visualization in the RAM; and the application layer communicating the extended visualization to the user.

5. A non-transitory computer readable storage medium as in claim 4 wherein the highlighted visualization is generated by a highlighting engine of the functional module.

6. A non-transitory computer readable storage medium as in claim 4 wherein the existing visualization comprises a chart and the visualization element changed in appearance comprises a data point, a legend text, and/or a category axis label.

7. A non-transitory computer readable storage medium as in claim 4 wherein the highlighted visualization comprises a horizontal bar chart, a vertical bar chart, a plot, or a pie chart.

8. A non-transitory computer readable storage medium as in claim 4 wherein the application layer automatically displays a search box in response to the search input.

9. A method comprising:

providing in a Random Access Memory (RAM) of a client located remote from a server, an application layer storing, a dataset responsive to a database query issued by the client to the server, and an existing visualization of the dataset including a first visualization element;

the application layer further storing in the RAM executable code of a functional module receiving a search input from a user and automatically creating a box displaying the search input;

the functional module searching the dataset according to the search input and a fuzzy search index to produce a search result;

the functional module transforming the search result and the existing visualization to create a highlighted visualization including a first changed appearance of the first visualization element and a second changed appearance of a second visualization element of the existing visualization, the second changed appearance different from the first changed appearance;

the application layer communicating the highlighted visualization to the user;

the functional module receiving an extended input from the user in response to the highlighted visualization;

the functional module processing the dataset according to the extended search input to produce an extended search result;

the functional module generating an extended visualization from the extended search result and the highlighted visualization;

the functional module storing the extended visualization in the RAM; and the application layer communicating the extended visualization to the user.

10. A method as in claim 9 wherein the dataset comprises a dimension and the search input reflects a dimension name or a dimension value.

11. A method as in claim 9 wherein the dataset comprises a measure and the search input reflects a measure name.

12. A method as in claim 9 wherein the existing visualization comprises a chart and the visualization element changed in appearance comprises a data point, a legend text, and/or a category axis label.

13. A method as in claim 9 wherein the extended input comprises a filter, the extended search result is smaller than the search result, and the extended visualization includes fewer elements than the highlighted visualization.

14. A method as in claim 9 wherein the highlighted visualization comprises a horizontal bar chart, a vertical bar chart, a plot, or a pie chart.

* * * * *